United States Patent [19]

Gobbi

[11] Patent Number: 4,907,469
[45] Date of Patent: Mar. 13, 1990

[54] SELF GUIDING ADJUSTABLE SNAP ON PLASTIC CLEAT AND BICYCLE PEDAL

[76] Inventor: Ronald R. Gobbi, 93R Scobie Pond Rd., Derry, N.H. 03038

[21] Appl. No.: 273,705

[22] Filed: Nov. 15, 1988

Related U.S. Application Data

[63] Continuation of Ser. No. 23,204, Mar. 9, 1987, abandoned.

[51] Int. Cl.⁴ .............................................. G05G 1/14
[52] U.S. Cl. ..................................... 74/594.6; 36/131; 74/594.4
[58] Field of Search .................... 74/594.4, 594.6, 560; 36/131-134

[56] References Cited

U.S. PATENT DOCUMENTS

| | | | |
|---|---|---|---|
| 1,379,646 | 5/1921 | Mueller | 36/132 |
| 4,377,952 | 3/1983 | Gamondes | 36/131 |
| 4,449,308 | 5/1984 | Schar | 36/131 |
| 4,506,463 | 3/1985 | Chassaing | 74/594.6 |

FOREIGN PATENT DOCUMENTS

| | | | |
|---|---|---|---|
| 0146761 | 7/1985 | European Pat. Off. | 36/131 |
| 3135346 | 5/1983 | Fed. Rep. of Germany | 36/131 |
| 3426103 | 1/1986 | Fed. Rep. of Germany | 74/594.6 |
| 3431935 | 3/1986 | Fed. Rep. of Germany | 36/131 |
| 2397319 | 2/1979 | France | 36/131 |
| 2405037 | 6/1979 | France | 36/131 |
| 2532530 | 12/1983 | France | 36/131 |
| 1189726 | 11/1985 | U.S.S.R. | 74/594.6 |
| 1685 | of 1893 | United Kingdom | 74/594.6 |

OTHER PUBLICATIONS

Ultrasport, Raben Publishing Co., Inc., May 1986, pp. 72, 73.
Bicycle Guide, Raben/Bicycle Guide Partners, Apr. 1987, pp. 60 and 65.
Bicycle Guide, Raben/Bicycle Guide Partners, Mar. 1986, p. 28.

*Primary Examiner*—Vinh Luong

[57] ABSTRACT

A plastic cleat on the bottom of a cycling shoe for securing the shoe to a pedal. The pedal has a round shaft for connecting to the cleat. The pedal also has rounded stops on the round shaft which are spaced to fit the cleat in between them. The cleat is comprised of a pair of flexible spaced surfaces, being spaced less than the diameter of the round shaft to create a tension to the passage of the round shaft. The spacing between the flexible edges can be changed in order to adjust the tension to the passage and removal of the round shaft. There is a concave surface of the cleat adjacent to the bottom of the shoe which can be changed with screws or other adjusting apparatus connecting to the bottom of the shoe. When the curvature of the concave surface is changed it changes the spacing between the edges. The surfaces adjacent to the flexible edges are angled towards the receiving opening to guide the round shaft into the opening.

4 Claims, 5 Drawing Sheets

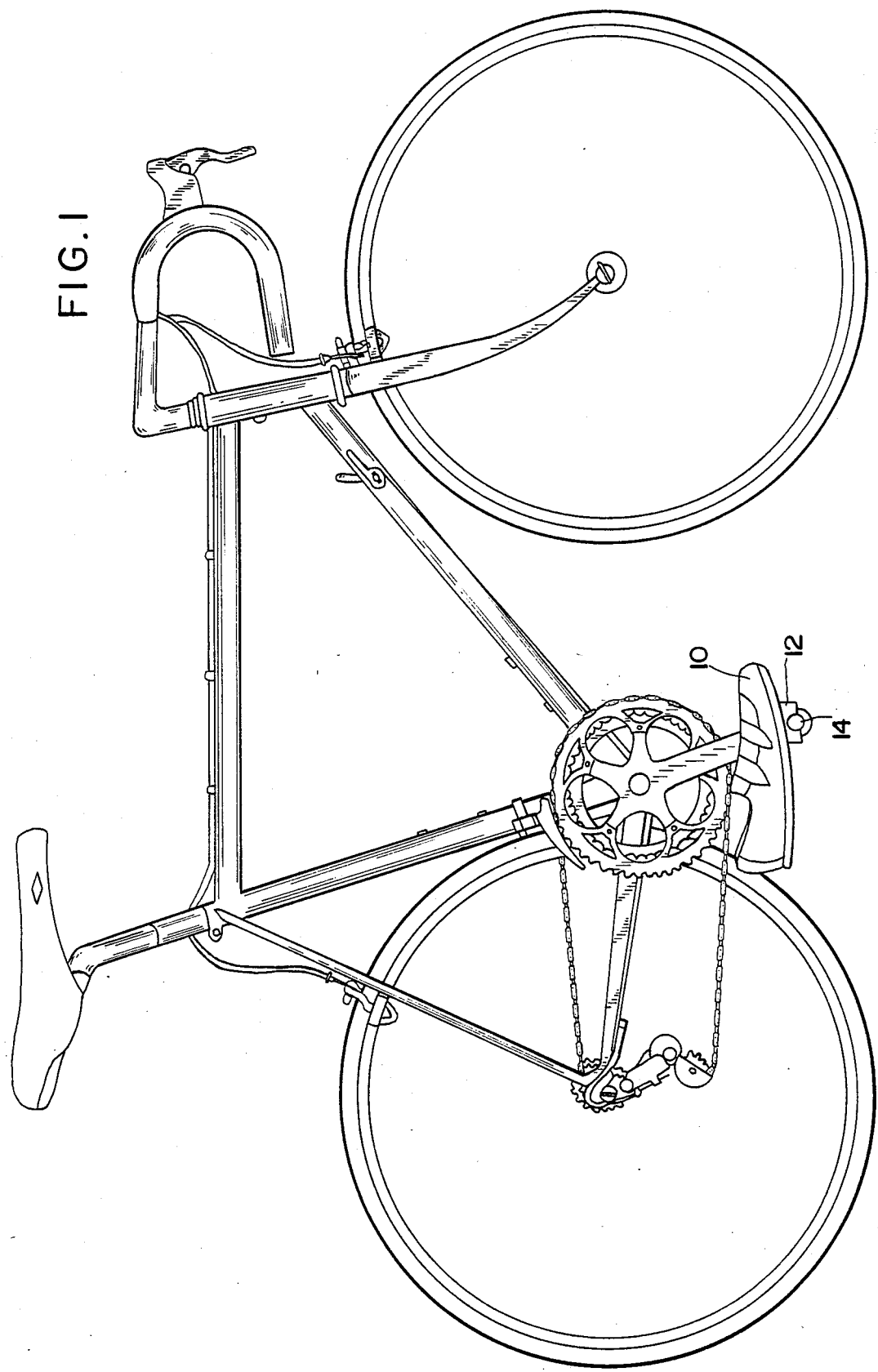

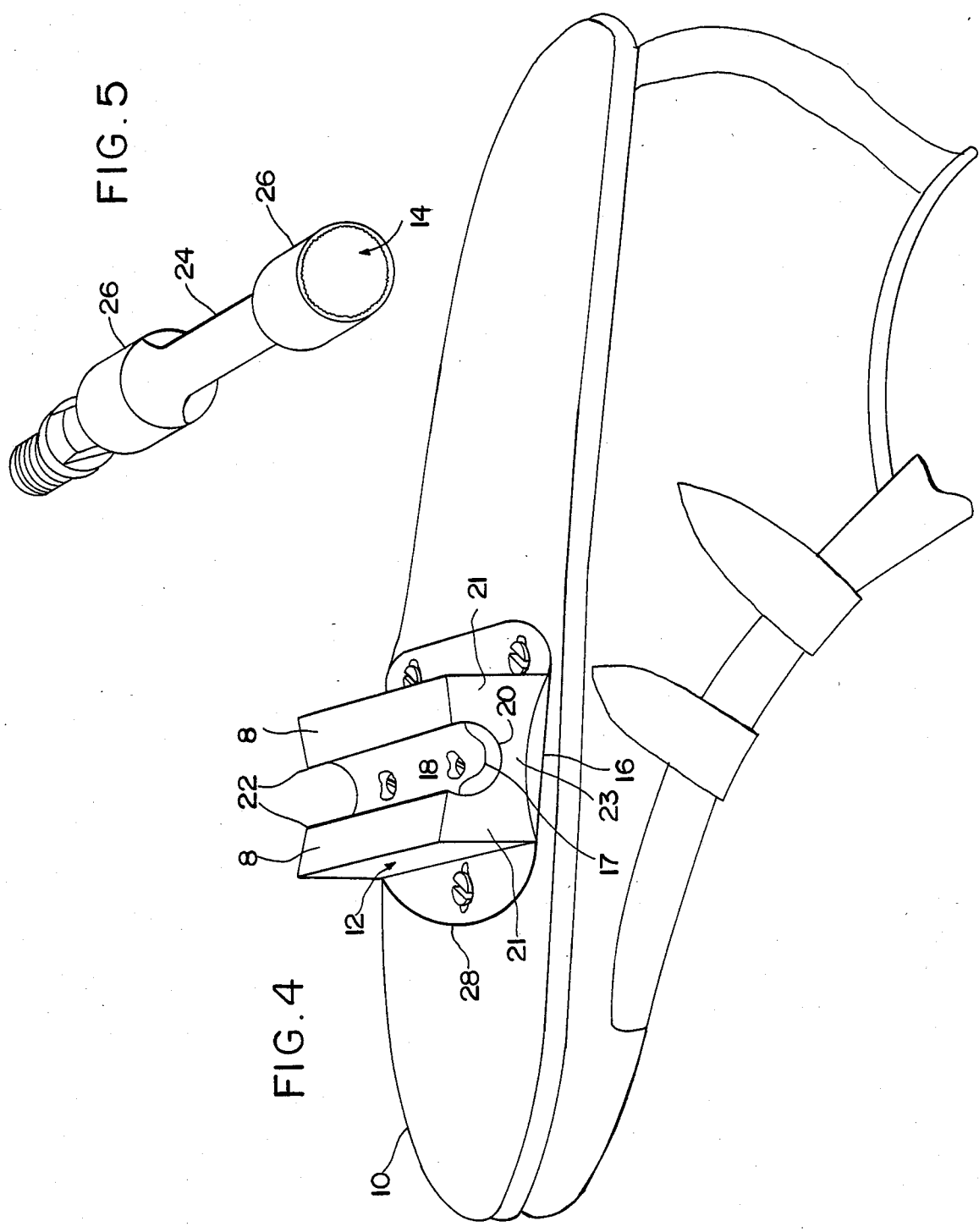

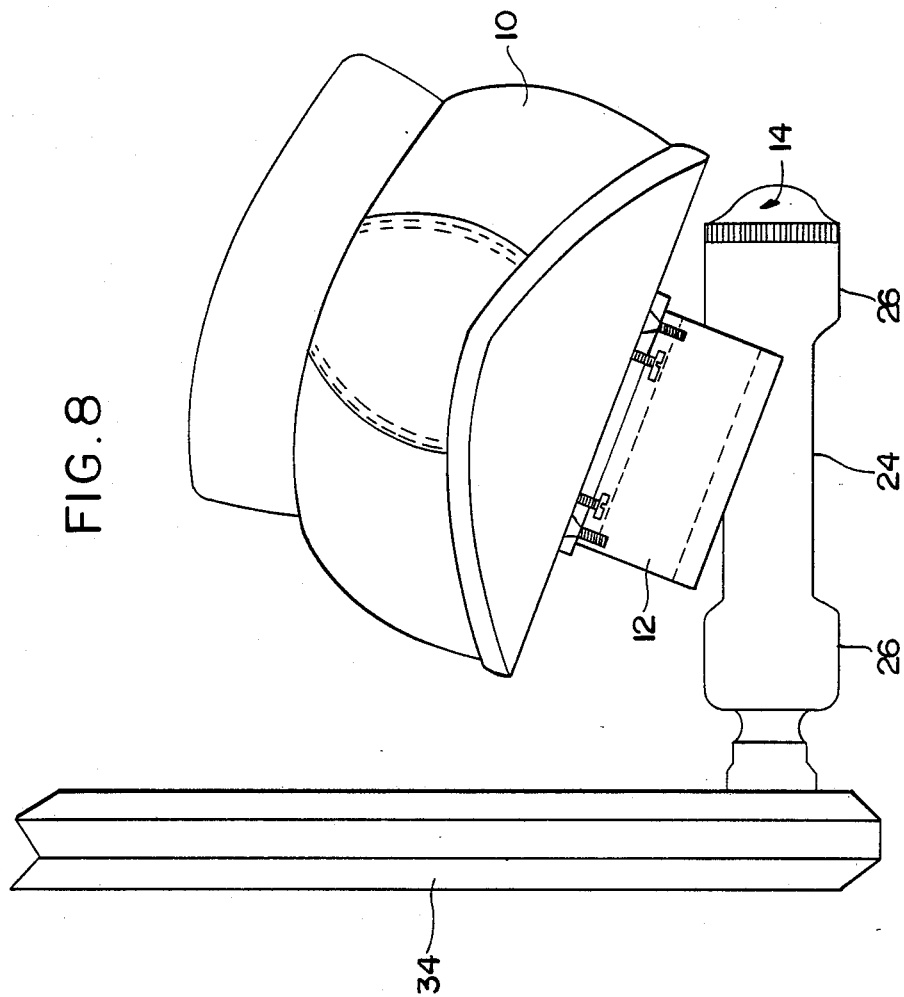

SELF GUIDING ADJUSTABLE SNAP ON PLASTIC CLEAT AND BICYCLE PEDAL

This is a continuation of co-pending application Ser. No. 023,204, filed on Mar. 9, 1987, now abandoned.

BACKGROUND OF THE INVENTION

1. Field of the Invention

The invention relates to cleats on the soles of bicycling shoes that snap on and make a connection to the bicycle pedals. More specifically, the invention relates to an improved cleat and pedal for bicyclists.

2. Description of the Prior Art

Rat trap bicycle pedals require; toe clips, toe straps and a thin cleat with a narrow slit mounted to the sole of the bicycle shoes. The cyclist must enter the toe clip with his/her shoe and pull the toe strap tight. Removal is done by reaching down and releasing the toe strap. Strapless and clipless systems are available, such as the Look pedal system (trademark of Descente America, Inc., 601 Madison Ave., New York, N.Y. 10022). This system consists of a pedal with a hoop and a spring loaded catch. The sole of the cyclists shoe has a cleat with a lip on the front and the back. To enter the cyclist must hook the front lip of the cleat on the hoop of the pedal and step down, causing the spring loaded catch to lock on the rear lip. Removal is done by a turn table twist of the foot. The CycleBinding system (trademark of Howell CycleBinding, Box 386, Winooski, Vt. 05404) and the Adidas System 3 (trademark of Bianchi USA, 385 Oyster Point Blvd., South San Francisco, Calif. 94080), both require special cycling shoes as well as special pedals. The shoe of the CycleBinding system has a cavity in the sole and the pedal has a cylinder with spring loaded pins that lock into the cavity. To enter the cyclist steps down on the pedal, to exit, a turn table twist of the foot. The Adidas shoe has a channel on each edge of the sole and a ridge on each edge of the pedal. To enter, the cyclist slides the shoe onto the pedal, to remove the shoe from the pedal the cyclist must release a lever on the pedal. The Keywin Speed Pedal (trademark of VeltecBoyer sports, Inc., 1793 Catalina, Sand City, Calif. 93955) is a pedal cleat system which consists of a plastic cleat and a plastic pedal with two opposing hooks and a central locating pin. To enter the cyclist flips up the pedal and places the shoe over the pedal in a pigeon-toed position while aligning with the central locating pin. The cleat is then locked by stepping down and twisting. Release is done by a twist of the foot to the outside. The Pedalmaster (trademark of Bicycle Parts Pacific, P.O. Box 640, Santee, Calif. 92071) is a collection of hardware and bolts that connect to a conventional rat trap pedal. To enter the cyclist pushes the pedal over with the shoe and slips the cleat onto the toe plate's tongue, then swings the heel in toward the bike. Release is done by swinging the foot outward and pulling back.

The Aerolite system (trademark of Aerolite, 1343 W. 18th St., Merced, Calif. 95340) is a strapless cleat system that consists of a plastic slotted cleat and a cylindrical pedal as shown in FIGS. 2 and 3. To enter, one must step down on the pedal. It is claimed in the Mar. 1986 issue of Bicycle Guide that 100 pounds of force is required to snap the semi-circular slot of the molded plastic cleat on the pedal. Exiting is done by rolling ones' foot to the side. The Aerolite system does not provide a method to adjust the insertion and release force of the cleat to the pedal. If the cleat and the pedal are not properly aligned when stepping down, the cleat could engage on the end of the pedal. This could cause the connection to come apart suddenly. The Aerolite cleat has two surfaces on each side of the slot that roll the pedal away from the channel when trying to enter the cleat.

It would be desirable to have a cleat and pedal arrangement that is adjustable and fits itself to the pedal shaft, with a means for guiding the cleat onto the round shaft.

SUMMARY OF THE INVENTION

The present invention provides a cleat and bicycle pedal arrangement that overcomes the problems of the prior art. The present invention is a plastic cleat on the bottom of a cycling shoe for securing the shoe to a pedal. The pedal has a round shaft for connecting to the cleat. The pedal also has rounded stops spaced to fit the cleat in between them. The cleat is comprised of a pair of flexible spaced surfaces, being spaced less than the diameter of the round shaft to create a tension to the passage of the round shaft. The spacing between the flexible edges can be changed in order to adjust the tension to the passage of the round shaft.

One novel feature of the invention is that the spacing between the edges is adjustable to adjust the tension as the cleat goes over the shaft.

A second novel feature is the concave surface adjacent to the bottom of the shoe used for adjusting. The curvature of the concave surface can be changed with one or more screws connecting to the bottom of the shoe, which changes the spacing between the edges.

A third novel feature is beveled surfaces adjacent to the edges which are angled towards the receiving opening to guide the round shaft into the opening.

A fourth novel feature is round stops on the round shaft which are spaced to allow the shaft to enter the receiving opening between the stops.

BRIEF DESCRIPTION OF THE DRAWINGS

FIG. 1 is a view of a bicycle shoe with said cleat mounted to the said pedal.

FIG. 4 is a perspective bottom view of a bicycle shoe with the cleat of the invention mounted to the bottom.

FIG. 5 is a perspective view of the pedal of the invention showing rounded stops spaced to fit the cleat between them.

FIG. 8 is a front view of the bicycle shoe with the cleat, FIG. 6 and the pedal, FIG. 5. The pedal is attached to the crank arm of a bicycle and the shoe is in the release position.

DETAILED DESCRIPTION OF THE PREFERRED EMBODIMENTS

Figures 2, 3:
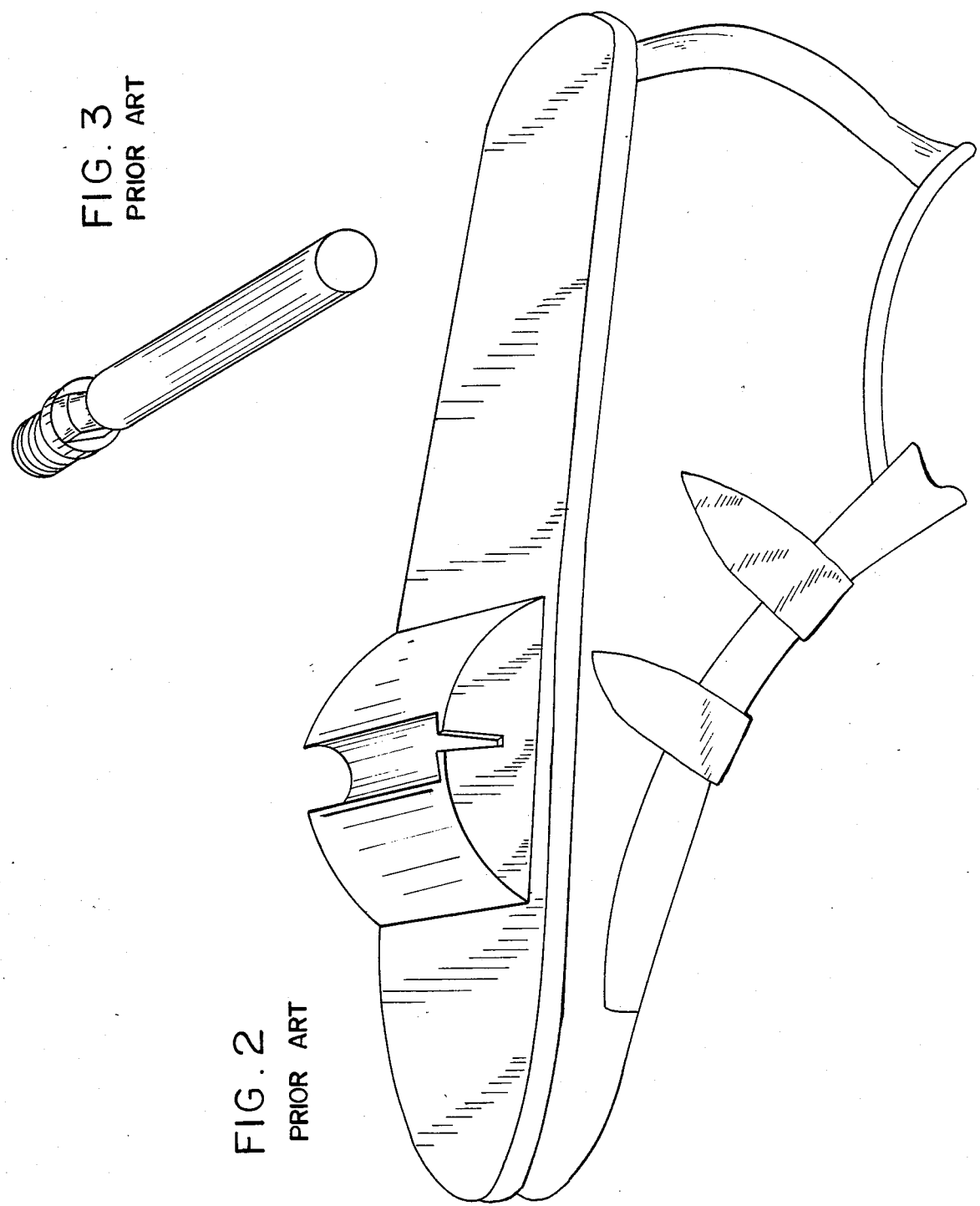
FIG. 2 is a perspective bottom view of a bicycle shoe with a prior art cleat mounted to the bottom.
FIG. 3 is a perspective view of a prior art pedal which is a straight shaft.

FIG. 1 shows a typical crankset on a bicycle. A bicycle shoe 10 has a cleat 12 mounted to the sole of the shoe. The cleat is engaged on a pedal 14 and a secure connection is made between the two.

FIG. 4 shows a perspective bottom view of a shoe 10 with the cleat 12 mounted to the sole. A metal backing plate 28 mounts the cleat to the sole. The metal backing plate has slotted holes in order to permit proper location. A concave surface 16 of the cleat, which is adjacent to the bottom of the shoe, is shown. A pair of inner surfaces 17 make up receiving opening 20. The inner surfaces 17 each have an edge 22. The space between the edges 22 can be adjusted by two screws 18 which can be seen in the receiving opening 20. The guiding surfaces 8, adjacent to the flexible edges 22, are angled towards the flexible edges 22 and the receiving opening 20. The prior art does not have these angled guiding surfaces 8 nor does it have a concave surface 16 and screws 18 or adjusting means for the purpose of pulling the concave surface 16 towards the metal backing plate 28 and adjusting the spacing of edges 22. The cleat 12 is made of a flexible material for example ultra high molecular weight plastic (UHMW). The figure shows the cleat as a single piece of flexible material having walls 21 connected together by a continuous piece of flexible material. This continuous piece of flexible material 23 is a means for connecting and moving the walls. In the preferred embodiment concave surface 16 allows the walls to be moved or adjusted. However the cleat could also be constructed of separate walls 21 with a separate means for connecting and moving the walls 23.

FIG. 5 shows a perspective view of the pedal 14, having a round shaft 24 for connecting it to the cleat 12. The larger, rounded stops 26 can be seen and are spaced to fit the cleat 12 in between them. Prior art does not have rounded stops 26.

Figure 6:
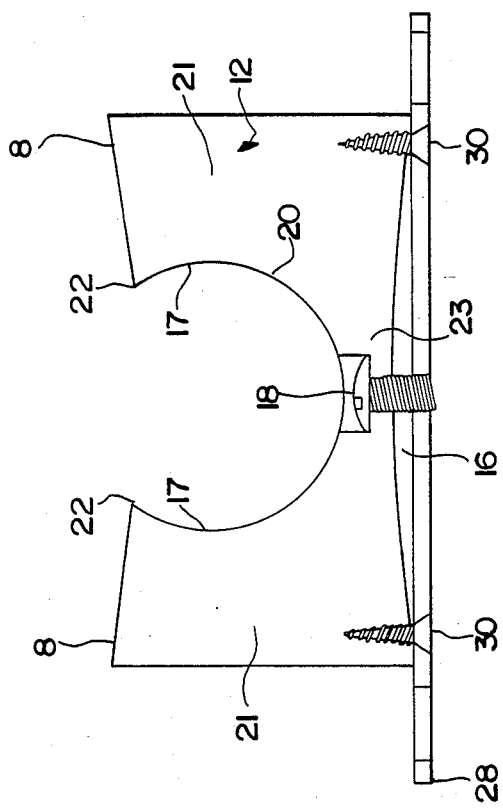
FIG. 6 is a side view of the cleat in FIG. 4, showing a concave surface with a screw to change the curvature of the concave surface. Beveled surfaces angled towards the receiving opening are shown.

FIG. 6 shows a side view of the cleat 12. The screw 18 is show protruding thru the concave surface 16 and threaded into the metal backing plate 28 below. When the screw 18 is tightened or loosened the flexible edges 22 move and the spacing between the flexible edges 22 decreases or increases. At the top of each wall 21, adjacent to the flexible edges 22 are guiding surfaces 8 angled towards the receiving opening 20, these surfaces guide the pedal into the receiving opening 20. Screws 30 are shown holding the cleat 12 to the back plate 28.

Figure 7:
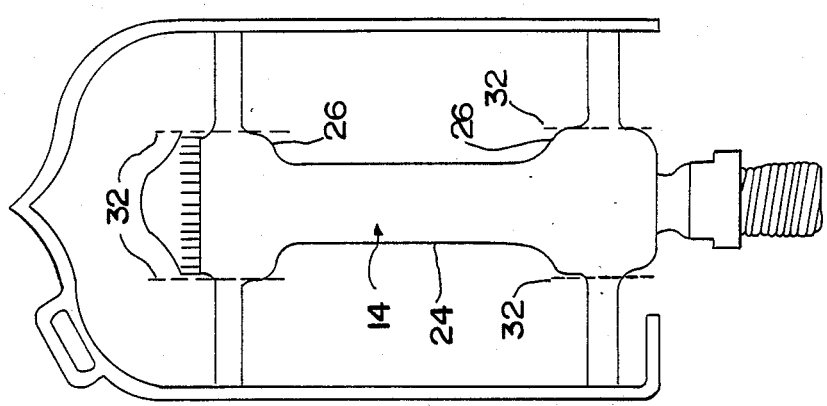
FIG. 7 is a common rat trap pedal before the modification of cutting away the cage area in order to make the pedal in FIG. 5.

FIG. 7 shows a top view of a rat trap bicycle pedal. At four places 32 indicated with dotted lines, the pedal may be cut with a saw. The pedal may be filed smooth at the four places, creating a round shaft 24 pedal with round stops 26. If desired, the rat trap pedal can be left in its' original form and it will still accept the plastic cleat 12, allowing a person to try out the feel of the cleats without permanently changing the pedals.

FIG. 8 shows the front view of a bicycle crank 34 with a pedal 14 mounted to it. The front view of a bicycle shoe 10 shows the cleat 12 mounted to it and the cleat is disconnecting from the round shaft 24 of the pedal. As the shoe rolls away, the cleat pops up and comes off the shaft.

In operation, the invention bears no resemblence to any prior art except the Aerolite system. The resemblence is that a cleat snaps onto a round shaft however, the resemblance stops there. The prior art makes no attempts to adjust the tension of the round shaft entering the cleat. The prior art has four screws only for the purpose of mounting the cleat to the shoe. This has the disadvantage of requiring the same insertion and release pressure for all of its' users, regardless of how much the user may weigh. For example a person who weighs 100 pounds cannot have as much insertion and release tension as a person who weighs 185 pounds. It is dangerous if a light person has too much tension, he or she would have difficulty snapping on and releasing the cleat from the pedal. It could become even more dangerous for example if a light person (whose cleat tension is too high) was fatigued and had even less strength to roll the foot away and release the cleat. On the other hand if a heavier person does not have enough tension, he or she could release the cleat from the pedal too easily. This could become dangerous becuase a cyclist uses the upward motion of the pedal stroke for more power during sprints or riding up hills and the cyclist is depending on a secure connection between the shoe and the pedal. If the cleat were to suddenly release, an accident could occur.

The invention uses one or more screws (or adjusting means) 18 to compress or release the concave surface 16 against the back plate 28, causing the spacing between the flexible edges 22 to change. In FIG. 4 and FIG. 6 it is shown that when the screws 18 are turned clockwise, the concave surface 16 is forced closer to the back plate 28, which in turn causes the walls 21 and their edges 22 to move towards each other resulting in more tension during pedal 14 insertion and removal. When the screws 18 are turned counter clockwise, the concave surface 16 is released and the walls relax and the edges 22 move apart causing less tension during pedal insertion and removal.

The prior art has surfaces adjacent to the edges that are angled away from the channel, causing the cleat to glide off the pedal. This is a drawback during insertion, because a cyclist may touch the pedal with the cleat and he/she has no guidance of the pedal towards the opening.

The present cleat has guiding surfaces 8 angled towards the flexible edges 22 and the receiving opening 20 which will guide the round shaft 24 of the pedal 14 into the space between the flexible edges 22.

The prior art does not have round stops on the pedal to locate the cleat in a side to side fashion. With the prior art, the user may locate the cleat onto the end of the pedal shaft in such a way that the pedal may or may not be fully engaged.

The present pedal has two round stops 26, which are spaced to allow the round shaft 24 of the pedal to enter the receiving opening 20 between the stops. The stops 26 are too large to enter the receiving opening 20.

The present invention allows the use of conventional rat trap pedals with a small amount of modification FIG. 5

What is claimed is:

1. A cleat (12) for securing the bottom of a shoe to a round shaft (24) of a pedal (14), the cleat comprising:
   a pair of walls (21) each having an inner surface (17) with a flexible edge (22), said flexible edges opposing and spaced to receive said round shaft (24) of said pedal (14),
   flexible material (23) connecting said pair of walls together, said flexible material having a concave surface (16),
   means for securing said cleat to the bottom of said shoe such that said concave surface is opposed and adjacent to the bottom of the shoe,
   an adjustment fixture (18) for coupling between said concave surface (16) and the bottom of said shoe to change the curvature of said concave surface thereby to change the spacing between said flexible edges to a selectable spacing to create a selectable tension to the insertion or removal of said round shaft.

2. The apparatus of claim 1 in which said walls (21) and said flexible material are made of a solid block of flexible material and in which said adjustment fixture is at least one threaded screw coupled to and extending through said flexible material to the bottom of said shoe.

3. A cleat (12) for securing the bottom of a shoe to a round shaft (24) of a pedal (14), the cleat comprising:
- flexible material (23) having a first concave surface (16), and a second surface defining an opening (20), the entrance to said opening having a pair of flexible edges (22) opposing and spaced apart to receive said round shaft (24),
- means for securing said flexible material to the bottom of said shoe with said concave surface opposed and adjacent to the bottom of said shoe,
- an adjustment fixture (18) for coupling between said concave surface (16) and the bottom of said shoe to change the curvature of said first concave surface and thereby select the spacing between said flexible edges to create a selectable tension to the insertion or removal of said round shaft.

4. A cleat (12) for securing the bottom of a shoe to a round shaft (24) of a pedal (14), the cleat comprising;
- flexible material (23) having first concave surface (16), and a second surface defining an opening (20), the entrance to said opening having a pair of flexible edges (22) opposing and spaced apart to receive said round shaft (24),
- means for securing said flexible material to the bottom of said shoe,
- an adjustment fixture (18) for coupling between said concave surface (16) and said means for securing to change the curvature of said first concave surface and thereby select the spacing between said flexible edges to create a selectable tension to the insertion or removal of said round shaft.

* * * * *